United States Patent [19]

Stephenson

[11] 4,303,209

[45] Dec. 1, 1981

[54] TENSION REDUCER FOR DUAL SPOOL RETRACTOR

[75] Inventor: Robert L. Stephenson, Utica, Mich.

[73] Assignee: Allied Corporation, Morris Township, Morris County, N.J.

[21] Appl. No.: 149,616

[22] Filed: May 14, 1980

[51] Int. Cl.³ .................... A62B 35/02; B65H 75/48
[52] U.S. Cl. ............................ 242/107.4 A; 280/806; 280/808
[58] Field of Search ......... 242/107, 107.4 R, 107.4 E; 280/802, 806–808; 297/475–480

[56] References Cited

U.S. PATENT DOCUMENTS

| | | | |
|---|---|---|---|
| 4,125,231 | 11/1978 | Henderson | 242/107 |
| 4,135,683 | 1/1979 | Stephenson et al. | 242/107.4 A |
| 4,216,922 | 8/1980 | Weman | 242/107 |

*Primary Examiner*—John M. Jillions
*Attorney, Agent, or Firm*—Roger H. Criss

[57] ABSTRACT

A dual spool seat belt retractor wherein the retraction force acting on the torso belt is reduced by connecting its rewind spring with the rewind spring of the lap belt. The connection may be made via a single shaft or a gear train.

14 Claims, 5 Drawing Figures

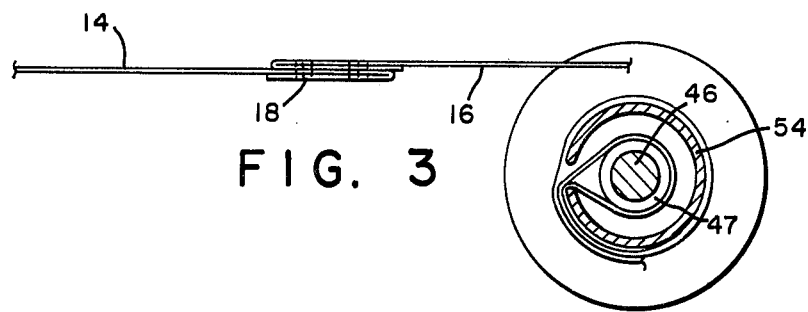
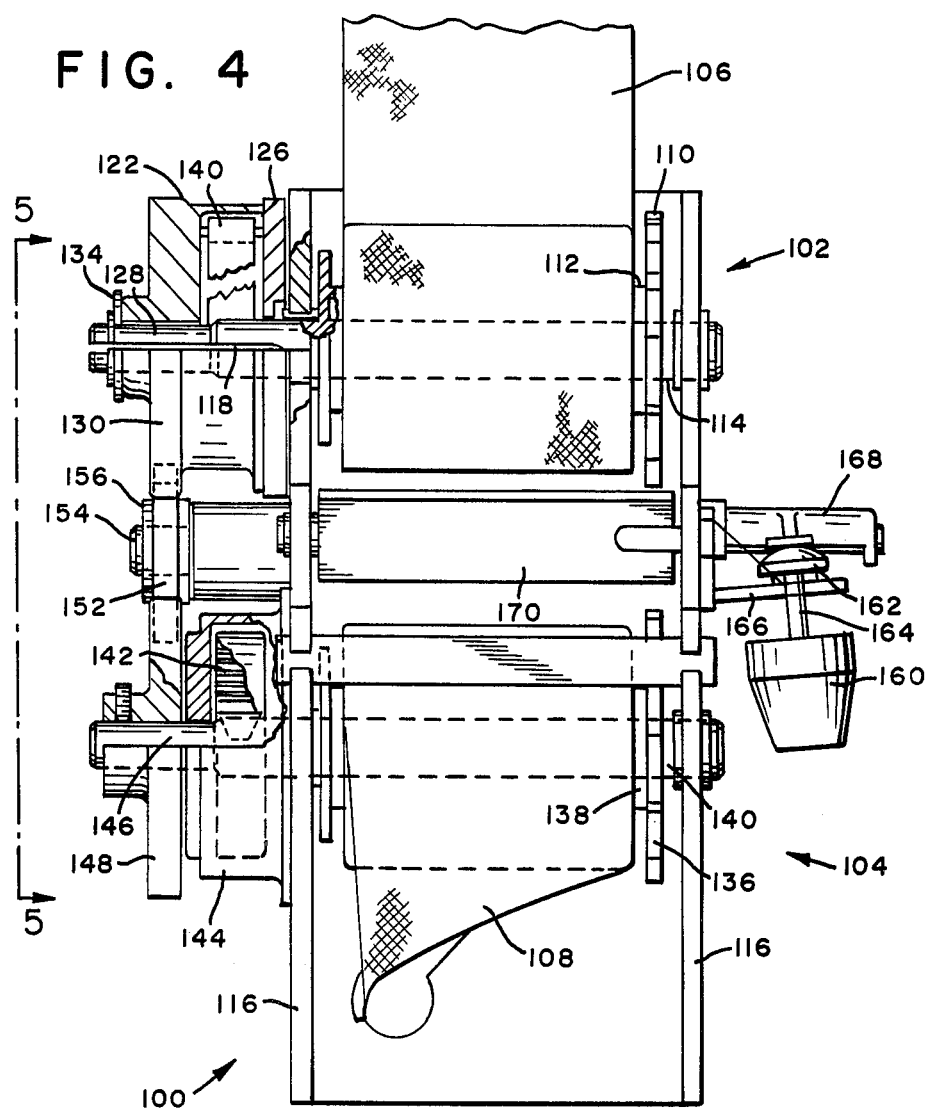

TENSION REDUCER FOR DUAL SPOOL RETRACTOR

DESCRIPTION

BACKGROUND OF THE INVENTION

1. Field of the Invention

This invention relates to a dual spool retracting mechanism, and particularly to a comfort mechanism for a dual spool seat belt retractor.

2. Description of the Prior Art

One of the major complaints associated with the wearing of seat belts is the uncomfortable pressure of the shoulder belt on the upper torso in some seat belt systems. Such pressures result from the need for high retraction forces to fully retract the belts when they become unbuckled. Full retraction is important in order to avoid having the belts become entrapped in the door.

Dual spool seat belt retractors for a single seating position are known, as is disclosed in U.S. Pat. No. 4,135,683 to Stephenson et al. In such retractors, separate lap and shoulder belt retracting mechanisms are housed within a single housing and separate lap and shoulder belts are wound up upon their respective retracting mechanisms. The belts are connected to a single tongue for extension about the occupant and engagement with a complimentary buckle.

It would be desirable to provide lower and more comfortable seat belt pressure on the upper torso of an occupant in a dual spool set belt retractor while still preserving the system's ability to fully retract the webbing when the system is unbuckled.

SUMMARY OF THE INVENTION

In accordance with this invention, there is provided a dual spool seat belt retractor comprising:
 first spool means;
 first seat belt webbing attached to the first spool means and adapted to extend across the torso of an occupant of a vehicle;
 a first rewind spring operably connected to the first spool means to rewind the first seat belt webbing onto the first spool means and to permit extraction of the first seat belt webbing from the first spool means;
 second spool means;
 second seat belt webbing attached to the second spool means and adapted to extend across the pelvic region of the occupant;
 a second rewind spring operably connected to the second spool means to rewind the second seat belt webbing onto the second spool means and to permit the second seat belt webbing to be extracted from the second spool means; and
 tension reducing means operable to reduce the rewind force of the first rewind spring acting on the torso of the occupant through the first seat belt webbing, the tension reducing means comprising:
 connecting means connecting the first and second rewind springs, the connecting means being operable to unwind the first spring means and thereby reduce its rewind force upon tightening of the second rewind spring in response to extraction of the second seat belt webbing from the second spool means.

The present invention thus provides a tension reducing comfort mechanism in a dual spool seat belt retractor in which the pressure on the upper torso of a wearer is reduced while permitting full rewind of both belts. The rewind springs for both belts are preferably connected by means of a single shaft or through a gear train mechanism.

BRIEF DESCRIPTION OF THE DRAWINGS

FIG. 3 is a cross-sectional view taken along line 3—3 of FIG. 1.

FIG. 4 is a plan view with parts broken away of a second embodiment of the retractor of this invention.

DESCRIPTION OF THE PREFERRED EMBODIMENTS

Figures 1, 2:
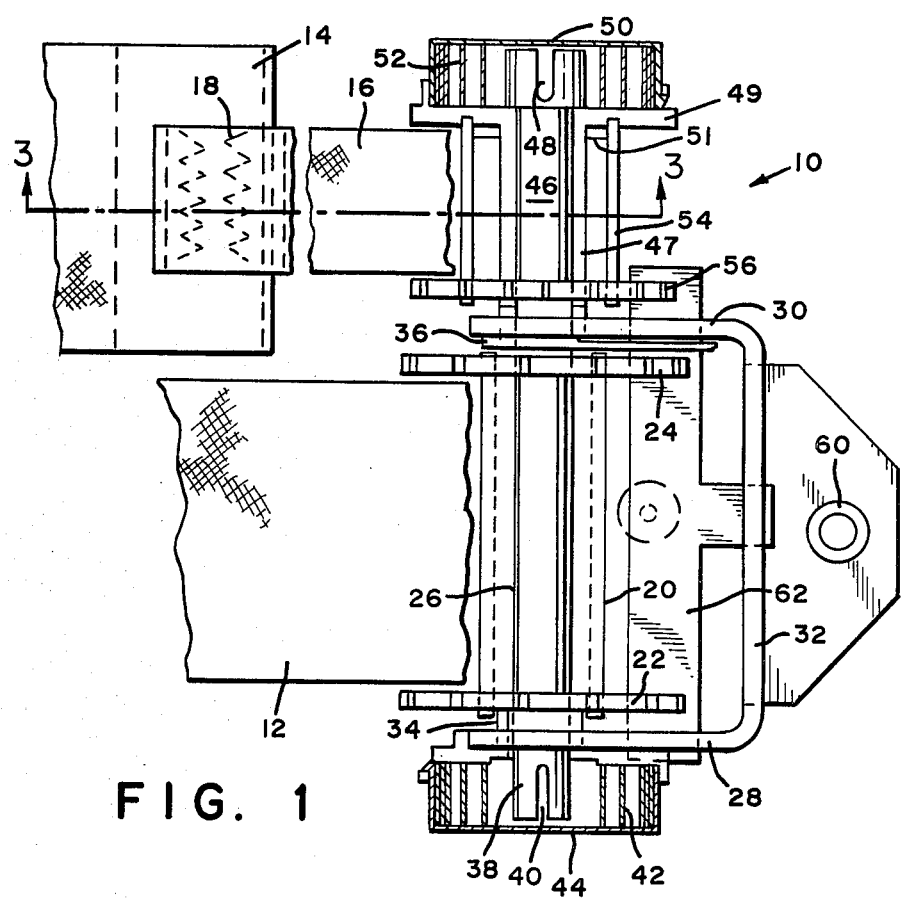
FIG. 1 is a plan view with parts broken away of one embodiment of the retractor of this invention.
FIG. 2 is a side view of the retractor of FIG. 1 taken along line 2—2 of FIG. 1.

With reference to FIG. 1, there is shown a first embodiment of the dual spool retractor of this invention, generally indicated at 10, which is adapted to wind up and extend lap belt 12 and torso belt 14. Lap belt 12 is in the form of standard width webbing and standard width webbing of torso belt 14 is connected to narrow belt webbing 16 via stitches 18 or the like; torso webbing 16 is wound up upon retractor 10. Vehicle geometry is usually such that when retractor 10 is floor mounted, the narrow torso belt webbing 16 will not contact the occupant when used, and, correspondingly, the standard width portion 14 of the torso belt webbing does not have to be spooled when the system is unbuckled. This approach can be used in such situations to reduce the overall length and therefore the weight of the retractor. Otherwise, full width webbing may be used and the spool size increased accordingly.

Lap belt 12 is wound up on a tube and gear assembly which includes spool 20 having ratchet wheels 22 and 24 fixed at its opposite ends. Spool 20 is fixed for rotation on shaft 26 which is journalled in legs 28, 30 of U-shaped frame 32 through bearings 34, 36. One end 38 of shaft 26 is slotted at 40 to which the inner end of the conventional spiral coil rewind spring 42 is attached. Spring 42 is retained in spring cap 44 fixed to leg 28 of frame 32 and the opposite end of spring 42 is attached to the inside circumferential surface of cap 44 in a conventional manner. Rotation of shaft 26 in the extraction direction winds spring 42 on shaft 26 as cap 44 is prevented from rotation due to its attachment to frame 32. Spool 20 and ratchet wheels 22, 24 are keyed to shaft 26 so that they rotate in unison. When lap belt 12 is fully stowed on spool 20, there exists a small number of prewinds of spring 42 on shaft 26, as is conventional, to insure full windup of the webbing.

The end of shaft 26 opposite slot 40 extends through leg 30 of frame 32 and forms shaft 46 for the torso belt retracting mechanism. The end of shaft 46 is slotted at 48 to receive the inner end of a spiral coil rewind spring 52 which is contained in spring cap 50. As with spring 42, the outer end of spring 52 is attached to the inside circumferential surface of cap 50. Extending around shaft 46 in a slip fitting arrangement is a gear and tube assembly in the form of a spool 54 having a ratchet wheel 56 fixed thereto at one end. An annular plastic member 47 surrounds shaft 46 and includes a generally circular end 49 upon which spring cap 50 is mounted. The opposite end of spool 54 is keyed to circular end 49 and metal washer 51 serves as a reinforcing spacer between member 47 and spool 54. Torso belt 14 is wound up on spool 54 in a suitable manner. Spring cap 50 is fixed to spool 54 via member 47 so that cap, 50, spool 54 and ratchet wheel 56 rotate in unison. In the fully stowed position of torso belt 14, spring 52 is partially wound up on shaft 44 to provide several more windings than necessary to insure full windup of the webbing.

Retractor 10 is provided with an aperture 60 for mounting to the vehicle in a conventional manner. Also, a vehicle sensitive lock up mechanism is associated with retractor 10 to lock both spools in the event of an emergency situation, such as upon rapid deceleration of the vehicle. The locking mechanism includes a pawl 62 pivotably mounted in openings 64 in legs 28, 30. Pawl 62 is actuated by a sensor mechanism shown in the form of a pendulum 66 extending from a cap 68 by a stem 70; cap 68 is supported in the retractor for tilting movement and its top is in contact with pawl 62 such that movement of pendulum 66 tilts cap 68 with the result that pawl 62 moves into locking engagement with the ratchet teeth on the three ratchet wheels 22, 24 and 56 to lock both spools; ratchet teeth 72 are shown in FIG. 2 for ratchet wheel 22.

In operation, if the torso belt webbing 14 only is extracted, shaft 26 remains fixed by virtue of no lap belt movement and spool 54, ratchet wheel 56 and spring cap 52 turn in unison due to the slip fit arrangement, commensurate with the pay out of that webbing. In doing so, additional windings of rewind spring 52 are wrapped onto shaft 46, thereby increasing the retraction force on the torso belt. In this condition, extraction of lap belt webbing 12 will cause ratchet wheels 22 and 24, spool 20 and shaft 26 to turn in unison, commensurate with the pay out of that webbing. Such rotation causes several windings of rewind spring 52 to unwrap from shaft 46 adjacent slot 48 since spring cap 50 is stationary by virtue of no torso belt movement. When lap belt webbing 12 is fully extracted, the retraction force on the torso belt 14 is accordingly reduced. Correspondingly, rewind spring 42 has wrapped about shaft end 38 to its maximum amount, causing the lap belt retraction force to be at its maximum.

If the lap and torso belts are extracted simultaneously, the above occurs accordingly. That is, extension of torso belt webbing 14 rotates spool 54 and spring cap 50 and thus tends to wrap rewind spring 52 more tightly on shaft 46 adjacent slot 48. However, tightening of spring 52 is prevented or reduced since extension of lap belt webbing 12 causes rotation of shaft 26 (and hence shaft extension 46) in the same direction, tending to unwind the inner end of spring 52 adjacent slot 48 and thereby counteracts the tendency of spring 52 to tighten due to rotation of its spring cap 50. At the same time, rotation of shaft 26 causes tightening of lap belt rewind spring 42. Thus, at the fully extended positions of the lap and torso belts, lap belt rewind spring 42 is in a fully wound condition and torso belt rewind spring 52 remains only partially wound on shaft 46. Thus, the pressure exerted by torso belt 14 on the torso of the occupant is reduced, although the pressure of lap belt 12 on the pelvic region remains high. This, however, provides a more comfortable feeling for most occupants.

Unbuckling of the system allows both webbings to be retracted. The weakened retraction force on the torso belt 14 is increased by the rewinding of its spring 52 on shaft 46 due to the rewind rotation of shaft 46 resulting from the lap belt retraction. Thus, both belts are fully wound up on the retractor.

Since the torso spool 54 is of a different diameter than the lap belt ratchet wheels 22 and 24, this assures that the pawl engagement will positively take place with the larger ratchet wheels 22, 24 followed by engagement with the smaller ratchet wheel 56. This feature is important, since engagement of the lap belt ratchet wheels cannot be allowed to be blocked by the torso belt ratchet wheel. A single ratchet wheel for the torso belt is of adequate strength since belt loads on the torso belt are lower than those on the lap belt; however, an additional ratchet wheel may be provided if desired.

With reference to FIGS. 3 and 4, there is shown a second embodiment of this invention, generally indicated as 100. Dual spool retractor 100 includes wind up mechanisms 102 and 104 for torso and lap belts 106, 108, respectively. Torso belt 106 is contained on an upper gear and tube assembly in the form of ratchet wheel 110 attached to spool 112 which is keyed for rotation with a shaft 114. Shaft 114 is journalled for rotation in a U-shaped frame 116. Shaft 114 is slotted at 118 to accept the inner end of a spiral coil rewind spring 120 which is contained in a spring cover 122 to which is attached the other end 124 of the rewind spring adjacent its circumferential inner surface. Spring cover 122 is fastened by suitable means to a face washer 126 which is slip fitted over shaft 114. When torso belt webbing 106 is fully stowed, spring 120 is partially wound up on shaft 114 to provide several more windings than necessary to insure full windup of the webbing. Rewind spring 120 wraps around shaft 114 when torso webbing 106 is extracted. Shaft 114 extends through spring cover 122 to provide an axle 128 for gear 130 which is integral to spring cover 122 or suitably attached to the spring cover so that they rotate in unison. Gear 130 has peripheral teeth 132 and is retained to shaft 114 via retaining ring 134.

Lap belt 108 is similarly wrapped about a gear and tube assembly in the form of a ratchet wheel 136 and spool 138 which is keyed for rotation with a shaft 140 journalled for rotation in frame 116. Shaft 140 is slotted to accept the inner end of a rewind spring 142 which is contained in a spring cover 144 which is fixed to retractor frame 116. When lap belt 108 is fully stowed on spool 138, there exists a small number of prewinds of spring 142 on an extension 146 of shaft 140, as is conventional, to insure full windup of the webbing. Rewind spring 142 is substantially fully wrapped about extension 146 of shaft 140 when the lap belt webbing is fully extracted. Shaft 146 extends through spring cover 144 in a slip fitting interface and accepts a gear 148 which is fixed to shaft 146 so that they rotate in unison. Gear 148 has peripheral teeth 150.

An idler gear 152 is located on a shaft 154 mounted to retractor frame 116 and is retained thereon by a snap ring 156. Idler gear 152 has peripheral teeth 158 which mesh with the teeth of gears 130 and 148 so that rotation of gear 148, caused by extraction of lap belt webbing 108, causes gears 130 and 148 to rotate accordingly.

A conventional vehicle sensitive locking mechanism is provided for retractor 100 and includes a pendulum 160 attached to cap 162 via stem 164; cap 162 is suspended from a support 166 in a conventional fashion. Cap 162 is in contact with plastic finger 168 which is mounted on frame 116 and is connected to one end of a pawl 170 pivotably mounted in frame 116 and which is operable to engage with ratchet teeth associated with ratchet wheels 110 and 136 to lock both wheels and prevent extension of both belts. For a detailed description of such a locking mechanism, reference is made to the aforementioned U.S. Pat. No. 4,135,683, the disclosure which is expressly incorporated herein by reference.

Figure 5:
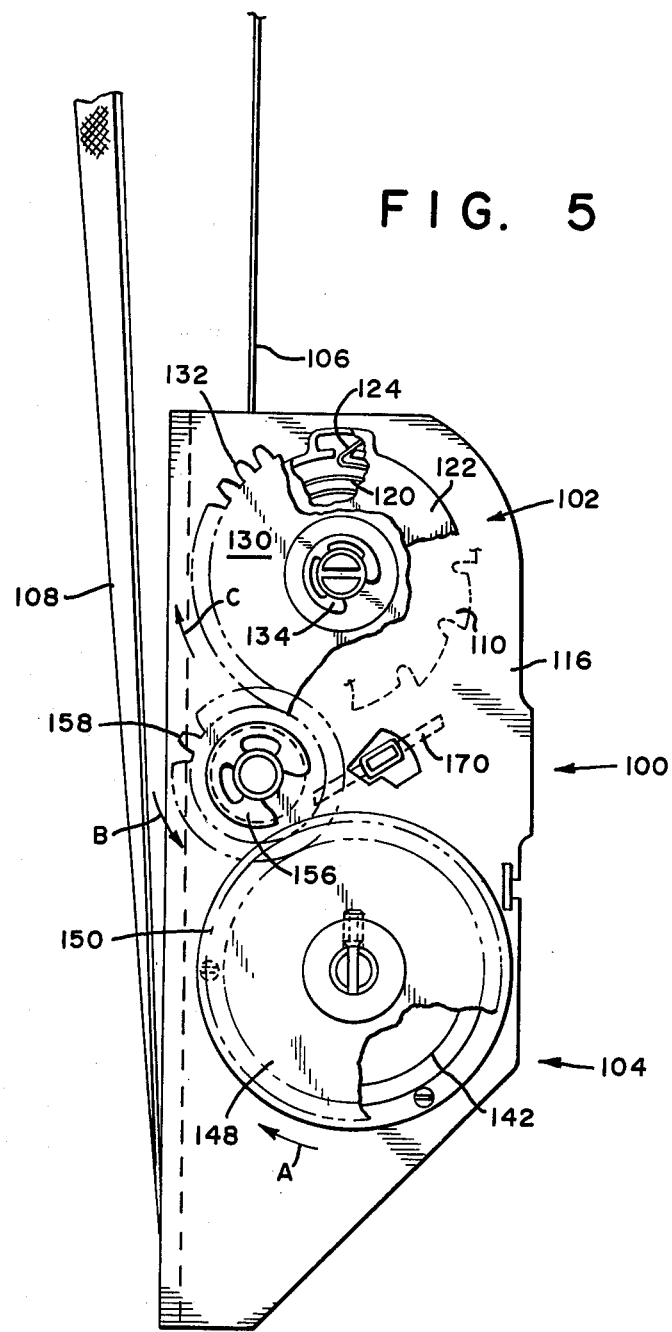
FIG. 5 is a side view of the retractor of FIG. 4 taken along the line 5—5 in FIG. 4.

In operation, if torso webbing 106 only is extracted, spring cover 122 and gear 130 remain fixed by virtue of the slip fit arrangement of washer 126 and shaft 114, and ratchet wheel 110, spool 112 and shaft 114 turn in unison commensurate with the pay out of that webbing. This rotation causes rewind spring 120 to wrap more tightly upon shaft 114, thereby increasing the retraction force on the torso webbing. Extraction of lap belt webbing 108 from this condition causes ratchet wheel 136, spool 138, shaft 140 and gear 148 to rotate in unison commensurate with the pay out of belt 108. Rewind spring 142 is accordingly wound more tightly onto shaft 114 thereby increasing the retraction force in lap belt 108. The rotation of gear 148 in the direction of arrow A in FIG. 5 causes rotation of gears 152 and 130 in the directions of arrows B and C. As a result, spring cover 122 rotates to unwrap several windings of rewind spring 120 from shaft 114 since shaft 114 is not rotating. When both belts are fully extracted, the torso webbing retraction force is reduced and the lap belt webbing retraction force is at its maximum, as in the first embodiment.

If both lap and torso belts are extracted simultaneously, the same result is achieved. That is, extension of torso belt webbing 106 rotates shaft 114 and tends to wrap rewind spring 120 more tightly on shaft 114 adjacent slot 118. However, tightening of spring 120 is prevented or reduced since extension of lap belt webbing 108 causes rotation of gear 148 and hence spring cover 122 through the gear train of gears 152 and 130. Since spring cover 122 is rotating in the same direction as shaft 114, no significant tightening of torso belt rewind spring 120 occurs. At the fully extended positions of both belts, lap belt rewind spring 142 is fully wound up on shaft 146 and torso belt rewind spring 120 remains only partially wound up on shaft 114, thereby reducing the pressure exerted by the torso belt on the occupant.

Unbuckling of the system described above permits the two webbings to be retracted. The weakened retraction force on the torso webbing is increased by the rewinding of spring 120 on shaft 114 due to the rewind rotation of spring cover 122 resulting from lap belt retraction. Thus, both belts are fully wound up on their spools.

It can thus be seen that the present invention provides a comfort mechanism in a dual spool seat belt retractor of a tension reducing type. A reduced tension is effected in the torso belt at the expense of an increased tension in the lap belt retractor. However, the increase in the lap belt pressure is not uncomfortable to the seat belt occupant compared with a similar increase in the torso belt pressure.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. A dual spool seat belt retractor comprising:
 first spool means;
 first seat belt webbing attached to said first spool means and adapted to extend across the torso of an occupant of a vehicle;
 a first rewind spring operably connected to said first spool means to rewind said first seat belt webbing onto said first spool means and to permit extraction of said first seat belt webbing from said first spool means;
 second spool means;
 second seat belt webbing attached to said second spool means and adapted to extend across the pelvic region of said occupant;
 a second rewind spring operably connected to said second spool means to rewind said second seat belt webbing on said second spool means and to permit said second seat belt webbing to be extracted from said second spool means; and
 tension reducing means operable to reduce the rewind force of said first rewind spring acting on the torso of said occupant through said first seat belt webbing, said tension reducing means comprising:
 connecting means connecting said first and second rewind springs, said connecting means being operable to unwind said first spring means and thereby reduce its rewind force upon tightening of said second rewind spring in response to extraction of said second seat belt webbing from said second spool means.

2. The retractor of claim 1 wherein said connecting means comprises a single shaft upon which each of said first and second rewind springs are wound.

3. The retractor of claim 1 wherein said connecting means comprises a gear train.

4. The retractor of claim 3 including a housing, first shaft means rotatably mounted in said housing and connected to said first rewind spring, and second shaft means rotatably mounted in said housing and connected to said second rewind spring, said first and second spool means extending over said first and second shaft means, respectively.

5. The retractor of claim 4 including a first gear operatively associated with said first rewind spring and mounted for rotation with respect to said first shaft means, and a second gear rotatable with said second shaft means.

6. The retractor of claim 5 including an idler gear interposed between said first and second gears, whereby rotation of said second shaft means resulting from extraction of said second seat belt webbing causes rotation of said second gear, said idler gear and said first gear, and unwinding of said first spring from said first shaft means.

7. The retractor of claim 6 including first cap means enclosing said first spring and being attached to one end thereof, the other end of said first spring being attached to said first shaft means, said first cap means being operatively associated with said first gear means and being mounted for rotation with respect to said first shaft means, and second cap means enclosing said second spring and being attached to one end thereof, the other end of said spring being attached to said second shaft means, said second cap means being non-rotatably mounted on said housing.

8. The retractor of claim 7 including locking means mounted on each of said first and second shaft means and means to lock said locking means.

9. The retractor of claim 2 wherein said first and second spool means extend over said shaft, one of said first and second spool means being mounted for rotation with said shaft and said other of said first and second spool means being mounted for rotation with respect to said shaft.

10. The retractor of claim 9 wherein said first spool means is mounted for rotation with respect to said shaft and said second spool means is mounted for rotation with said shaft.

11. The retractor of claim 10 including first cap means enclosing said first spring and being attached to one end thereof, the other end of said first spring being attached to said shaft, said first cap means being operatively associated with said first spool means so as to be rotatable with respect to said shaft, and second cap means enclosing said second spring and being attached to one end thereof, the other end of said second spring being attached to said shaft, said second cap means being non-rotatably mounted in said retractor, whereby rotation of said shaft resulting from extraction of said second seat belt webbing causes unwinding of said first rewind spring from said shaft.

12. The retractor of claim 11 wherein said first and second rewind springs are mounted on opposite ends of said shaft.

13. The retractor of claim 12 including locking means fixed to both said first and second spool means, and means to lock said locking means.

14. The retractor of claim 1 including a single locking means to lock both said first and second spool means.

* * * * *